[11] 3,585,594

[72] Inventor Fred N. Schwend
Arcadia, Calif.
[21] Appl. No. 860,548
[22] Filed Sept. 24, 1969
[45] Patented June 15, 1971
[73] Assignee Clary Corporation
San Gabriel, Calif.

[54] VERIFYING DEVICE FOR CREDIT CARDS OR THE LIKE
9 Claims, 5 Drawing Figs.

[52] U.S. Cl..................................................... 340/149
[51] Int. Cl..................................................... H04q 9/00
[50] Field of Search.......................................... 340/149;
235/61.7, 61.7 B

[56] References Cited
OTHER REFERENCES
NEW PRODUCTS, " Machine That Takes Security In Hand" Business Week May 10, 1969 page 151 (Copy in Class 340/149)

*Primary Examiner*—Donald J. Yusko

ABSTRACT: A device for verifying ownership of a credit card, pass, or the like, in which holes are provided indicating, by their position, a code representing the dimensions of certain of the owner's fingers. When the card owner advances his hand against slides carrying optical elements, such elements are aligned with each other and with the holes in the card to pass beams of light from a lamp within the device.

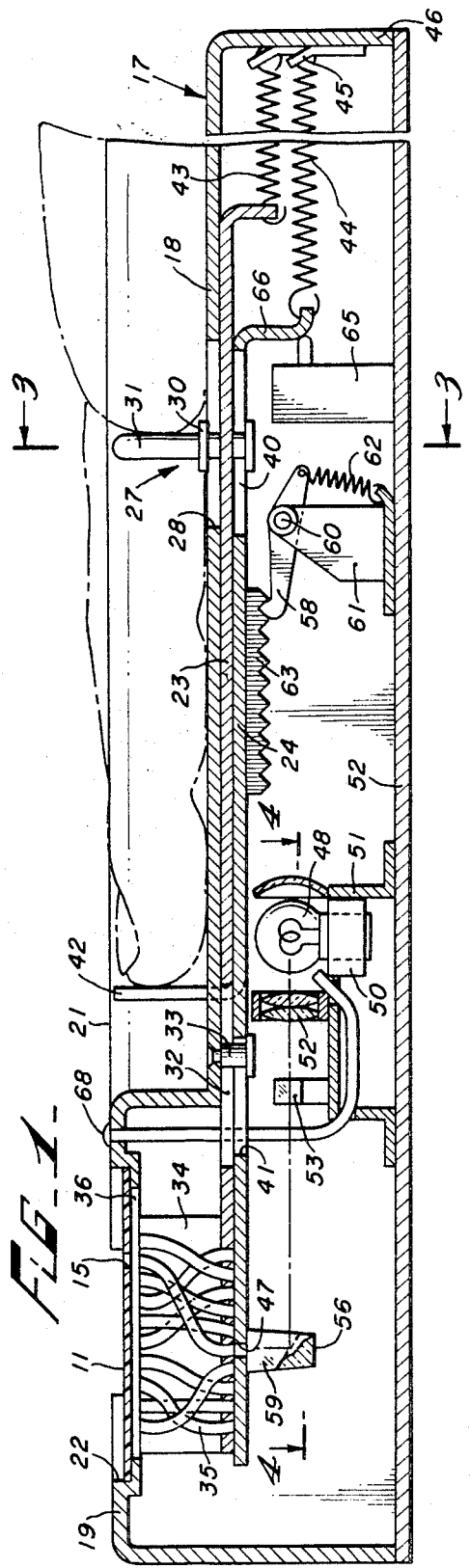
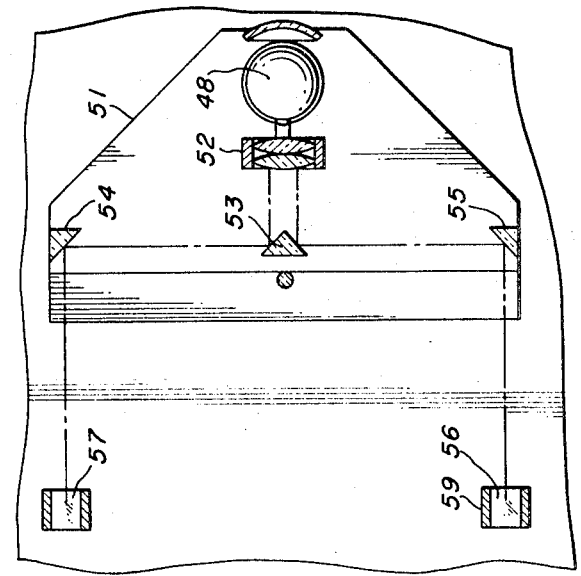
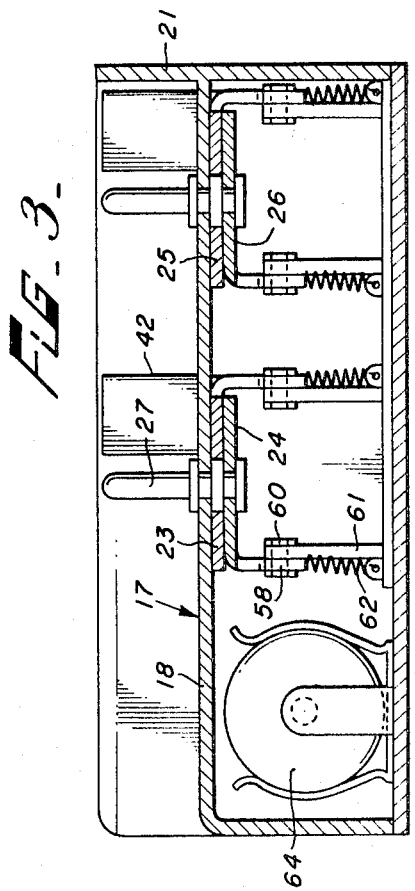

PATENTED JUN 15 1971
3,585,594
SHEET 2 OF 2
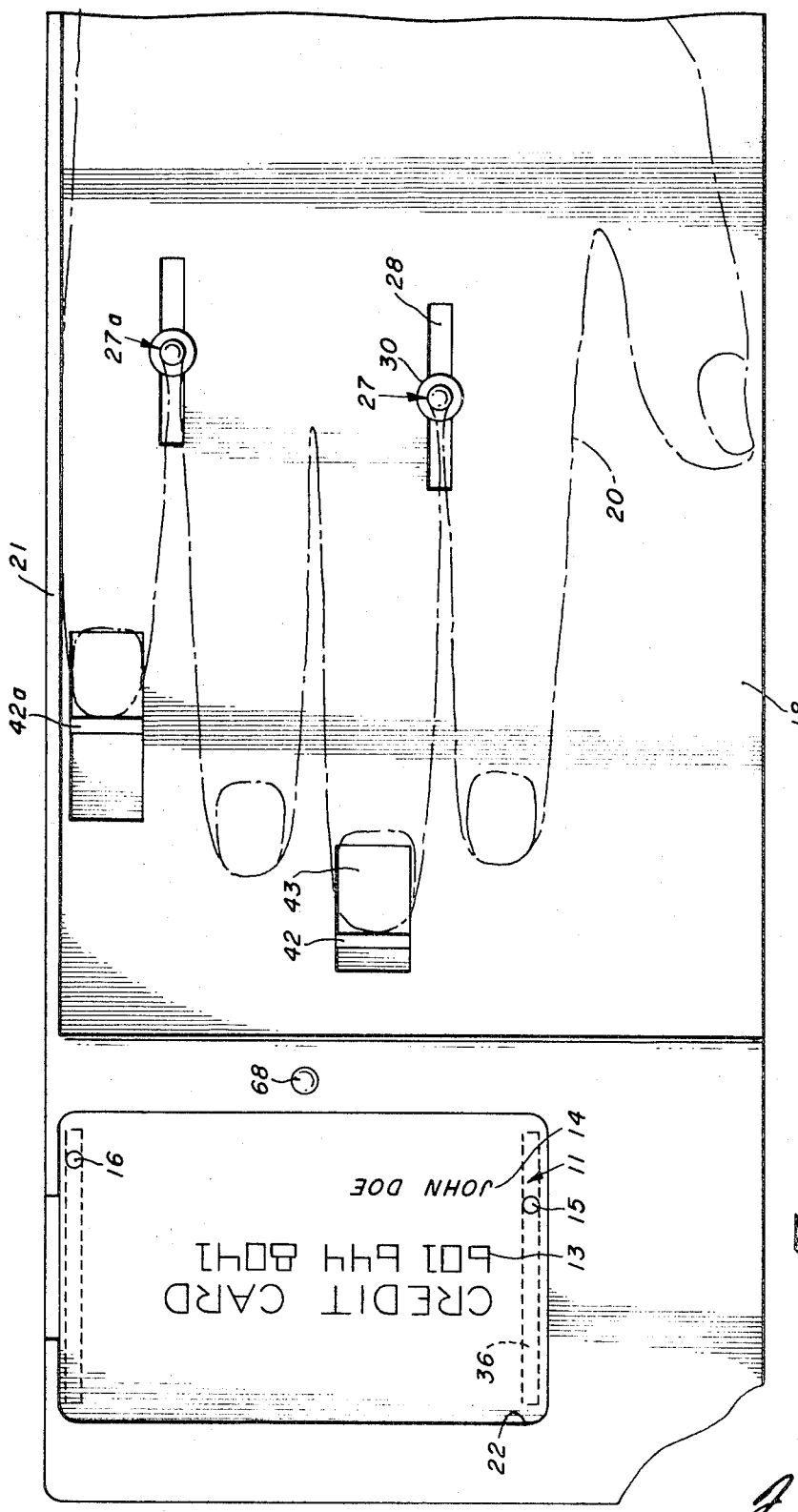
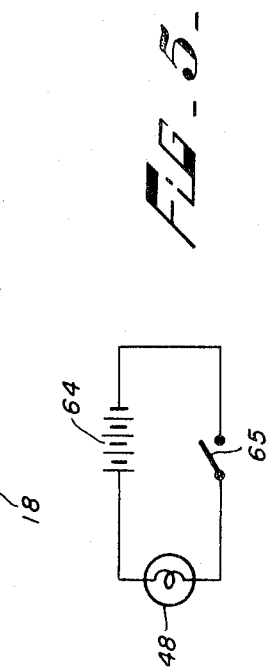
INVENTOR.
BY [signature]

VERIFYING DEVICE FOR CREDIT CARDS OR THE LIKE

This invention relates to means for effecting positive identification of a person by bodily measurements and has particular reference to means for verifying the ownership of credit cards, passes, etc. using certain body measurements.

The use of credit cards to authorize purchases of services and/or items on credit has been widespread in the last several years. On the other hand, similar cards are used for authorizing entry into security areas such as industrial plants, banks, hospitals, etc.

Although such credit or pass cards are highly desirable and have definite advantages, there is always the possibility that they may become lost or stolen, in which case they may be used by unauthorized persons to make unwarranted purchases or gain entry into restricted areas.

Although the use of photographs and owners' signatures on such cards aid in detecting use of the cards by other than the owners, such cards can be altered to replace a photograph or to forge a signature, thereby enabling them to be used by unauthorized persons.

Secret code numbers, known only to the card owner, have been proposed heretofore. In such case, the person holding the card and wishing to make a purchase or gain entrance to a restricted area gives the clerk or security guard such secret number which is compared by means of a decoding device with a scrambled code found on the card. Although such system works satisfactorily there is always the possibility that the owner may forget his code number or that an unauthorized person could somehow learn of the code.

It therefore becomes a principal object of the present invention to provide a relatively simple and inexpensive device for verifying ownership of a credit or pass card.

Another object is to provide a device of the above type which will positively verify ownership of a credit or pass card.

Another object is to provide a device of the above type which is self-contained and portable.

The manner in which the above and other objects of the invention are accomplished will be readily understood on reference to the following specification when read in conjunction wit the accompanying drawings, wherein:

FIG. 1 is a longitudinal sectional view through a card verifying device embodying a preferred form of the present invention.

FIG. 2 is a plan view of the device, partly broken away.

FIG. 3 is a transverse sectional view of the device as taken substantial along the line 3–3 of FIG. 1.

FIG. 4 is a sectional plan view through part of the optical system and is taken substantial along the line 4–4 of FIG. 1.

FIG. 5 is a schematic view of the electrical system.

Referring to the drawings, the device is disclosed as a credit card verifier and is arranged to accept standard credit cards 11 of plastic or similar material on which the owner's account number 13 and name 14 are embossed to effect printing of the same onto a suitable record or invoice form (not shown) through a carbon paper or inked ribbon. Two holes 15 and 16 are formed in a card along the opposite side edges thereof and in locations representing in a scrambled code relation, the lengths of the card owner's middle and small fingers and their relative locations.

The device comprises a housing 17, the upper wall 18 of which forms a platform on which the card holder rests his right hand, as shown by the dot and dash lines 20. A ledge 21 is formed along one side of the housing to guide the card holder's hand.

The rear portion 19 of the housing is raised and the upper surface thereof is recessed at 22 to receive the credit card 11 and to properly orient the same.

Two similar pairs of independently movable slides 23, 24 and 25, 26 are provided. Slide 23 of the left-hand pair has a guide pin 27 secured thereto and guided in an elongate slot 28 in the upper wall 18 of the housing. A flange 30 guides the pin along the upper wall surface 18 and an extension 31 of the pin extends upwardly sufficiently to be engaged by the crotch between the card owner's middle and index fingers.

The rear end of the slide 23 has elongated slot 32 formed therein and guided along a guide stud 33 secured to the upper wall 18. A bracket 34 is formed integrally with the slide 23 to support a plurality of light conduits or pipes 35 preferably in the form of optical fiber bundles. Such light pipes are fitted at their lower ends in a row of holes formed in the slide 23, such row extending lengthwise of the slide and evenly spaced there along. The light pipes are curved to different extents and terminate at their upper ends in different locations which differ in location from their lower ends according to a scrambled code relationship. The upper ends of the light pipes are arranged in a row also extending lengthwise of the slide, and in any suggested position of the slide, the upper end of one such light pipe is vertically aligned with the opening 15 in the credit card, through a slot 36 formed in the upper wall 18.

The lower slide 24 of the left-hand pair of slides has a pair of elongate guide slots 40 and 41 slideably embracing the pin 27 and stud 33, respectively, permitting endwise movement of the slide 24 relative to slide 23. An ear 42 is formed on the slide 26 and extends upwardly through a slot 43 in the upper wall 18, such ear being adapted to be engaged by the tip of the card holder's middle finger.

The slides 23 and 26 are independently urged forwardly of the device by tension springs 43 and 44 extending between respective one of the slides and an anchor piece 45 suitably attached to the forward wall 46 of the housing. It should be noted, however, that the various slides are shown in differentially advanced positions, as located by the card holder's hand 20.

An opening 47 is formed in the slide 26 directly below the row of light pipes 35 to transmit a beam of light upwardly through an aligned one of such light pipes.

Yieldable detents 58 are pivotally supported at 60 on brackets 61 and are urged by tension springs 62 into engagement with detenting teeth 63 formed integrally with the slides 23 and 24. Such detents tend to locate the slides in incremental positions wherein the light pipes 35 are vertically aligned with the openings 47 and the holes 15 in the credit card 11 but are insufficient to overcome the pull of the tension springs 43 and 44.

The slides 25 and 26 of the right-hand pair of slides are similar in construction and function to the slides 23 and 24.

As shown in FIGS. 3, 4 and 5, an optical system is provided for projecting beams of light from a lamp 48, upwardly through the opening 47 and a similar opening (not shown) formed in the slide 26. The lamp is supported in a holder 50 mounted on a bracket 51 supported from the bottom wall 52 of the housing. The bracket also supports a collimator lens 52, a beam splitting reflector prism 53 and two reflecting prism 54 and 55, the latter being effective to direct the split beams along parallel paths onto reflecting prisms 56 and 57 supported from the slides 24 and 26, respectively, by holders, i.e., 59.

As seen in FIGS. 1, 3 and 5, the lamp 48 is connected in circuit with a battery 64 and a normally open switch 65, the latter having a plunger engageable with a depending ear 66 formed on tne slide 24.

Describing now the operation of the device in verifying the ownership of a credit card, the card holder gives the store clerk or similar person his credit card 11 in which the holes 15 and 16 are positioned to correspond, in coded form, to the lengths of the card owner's middle and small fingers and to their relative positions. Such card is placed in the recess 22 and the card holder then places his right hand on the upper wall 18 and against the ledge 21. As he slides his hand rearwardly along the ledge 21, the tips of his middle and small fingers pick up the ears 42 and 42a of the slides 24 and 26, respectively, differentially moving the same rearwardly. His finger crotches also pick up the pins 27 and 27a whereby they also differentially move the respective slides 23 and 25. Such slides are moved rearwardly until slide 24 closes switch 65 to light the lamp 48 and arrest rearward movement of the card holder's hand, thereby leaving the slides 23, 25, and 26 in different positions. If the holes 15 and 16 in the card 11 have been properly located and the card holder is the true owner of the card, light beams will be projected upwardly through each of the holes in the card 11, thereby signifying this fact.

In order to indicate that the lamp, battery and switch 65 are in proper operating condition, a light pipe 68 extends from a location adjacent to the lamp 48 through the upper wall 18 of the housing whereby it may be readily determined if the lamp is lit.

If desired, additional pairs of slides may be provided to measure the lengths of the remaining fingers of the card holder and to compare the results with additional holes in the card which are located to represent such lengths and their relative positions.

I claim:

1. A device for determining authenticity of a credit card or the like having an opening therein located in a position representing a certain measurement of a person's hand, comprising:
   means for supporting said card,
   a pair of members,
   means supporting said members for movement relative to said card and independently of each other,
   means on one of said members engageable by one part of said person's hand,
   means on the other of said members engageable by another part of a person's hand,
   means on said one member forming a row light transmitting elements movable under said opening upon movement of said one member,
   means on said other member forming an additional light transmitting element for transmitting a beam of light through different ones of said row of elements upon movement of said other member whereby said light beam will be transmitted through said opening only if the position of said opening in said card corresponds to said certain measurement of said person's hand.

2. A device according to claim 1 wherein the light exit ends of said row of light transmitting elements are arranged in a pattern different from the light entrance ends thereof.

3. A device according to claim 1 wherein said row of light transmitting elements comprises light transmitting members having their light exit ends related to their light entrance ends in accordance with a scrambled code.

4. A device according to claim 1 comprising a light source, and means carried by said other member for directing a beam of light from said light source through said additional light transmitting element in all positions of said other member.

5. A device according to claim 4 comprising means operable by one of said members for controlling said light source.

6. A device according to claim 1 comprising spring means for independently retracting said light members from positions advanced by said person's hand.

7. A device for determining authenticity of a credit card or the like having a light transmitting area thereon located in a position representing the length of a finger of a person's hand, comprising
   means for supporting said card,
   a pair members,
   means supporting said members for movement relative to said card and independently of each other,
   a projection on one of said members engageable by the tip of said finger,
   a projection on the other of said members engageable by a finger crotch of said person's hand,
   means on a first one of said members forming a row of light transmitting elements movable under said light transmitting area upon movement of said first member,
   means on a second one of said members forming an additional light transmitting element for transmitting a beam of light through different ones of said row of elements upon movement of said second member whereby said light beam will be transmitted through said light transmitting area only if the position of said light transmitting area corresponds to the length of said person's finger.

8. A device according to claim 7 wherein said projection on said other member is engageable by the finger crotch between said finger and a next adjacent finger.

9. A device according to claim 7 comprising a normally extinguished light source and,
   means responsive to movement of one of said members for causing said light source to illuminate.